United States Patent [19]

Symmons

[11] 4,453,569
[45] Jun. 12, 1984

[54] CHECK VALVE WITH INSPECTION MEANS
[75] Inventor: Paul C. Symmons, Wellesley, Mass.
[73] Assignee: Symmons Industries, Inc., Braintree, Mass.
[21] Appl. No.: 357,997
[22] Filed: Mar. 15, 1982
[51] Int. Cl.³ .............................................. F16K 15/04
[52] U.S. Cl. .................................... 137/879; 137/539; 137/559; 137/886
[58] Field of Search ................ 137/879, 881, 559, 539, 137/886

[56] References Cited
U.S. PATENT DOCUMENTS 1,891,586 12/1932 Woerner ........................ 137/559 X
2,184,643 12/1939 Holmboe ........................... 137/559
3,289,694 12/1966 Frye ............................. 137/599 X
4,216,907 8/1980 Fuller ............................ 137/881 X

FOREIGN PATENT DOCUMENTS 775878 1/1935 France ............................. 137/881
849370 11/1939 France ............................. 137/539
87042 1/1956 Norway ............................ 137/539

Primary Examiner—Robert G. Nilson
Attorney, Agent, or Firm—Schiller & Pandiscio

[57] ABSTRACT

A check valve incorporating inspection valve means therein for disclosing the presence or absence of fluid on the "upstream" side of the valve.

5 Claims, 7 Drawing Figures

CHECK VALVE WITH INSPECTION MEANS

FIELD OF THE INVENTION

This invention relates to valves in general, and more particularly to check valves.

BACKGROUND OF THE ART

Check valves per se are well known in the art. Such valves function as a one-way gate in a fluid line by permitting fluid to flow through the valve in one direction while checking fluid flow through the valve in the reverse direction. Check valves are commonly employed in fluid systems where one needs to be certain that the fluid in the system will flow through the pipes in only one direction, e.g. a domestic fresh-water line, or a waste disposal line.

Many designs now exist for check valves. One of the most common designs comprises a cylindrical valve casing which has a fluid passageway extending along its major axis, a valve seat disposed about the perimeter of one segment of the passageway, a valve member movably disposed within the passageway, and spring means for yieldably urging the valve member into engagement with the valve seat so as to close off the passageway. This construction acts so that when fluid flows into the passageway in a first direction whereby the pressure of the fluid acts to reinforce the spring bias on the valve member, the valve member will remain firmly seated on the valve seat and the passageway will be closed off to fluid flow. At the same time, however, when fluid flows into the passageway in a second opposite direction whereby the pressure of the fluid works against the spring bias on the valve member, the valve member can disengage from the valve seat and open up the passageway to fluid flow so long as the pressure exerted on the valve member by the fluid flow is greater than the pressure exerted on the valve member by the spring means. As a result, when a suitable check valve of this construction is inserted into a fluid line, the valve will act as a one-way gate in the line and permit fluid flow through the valve in one direction while checking fluid flow through the valve in a reverse direction.

Check valves utilizing such a design have rendered excellent service in many piping systems. Unfortunately, however, they suffer from one serious disadvantage. When such a check valve has been installed in a fluid line and the flow of fluid through the valve ceases, an observer monitoring the "downstream" side of the valve cannot be certain precisely why the flow has stopped: the flow through the valve could have stopped because there is insufficient fluid pressure present on the "upstream" side of the valve to move the valve member off the valve seat, or the flow could have stopped because debris and/or mechanical malfunction of the valve impedes the disengagement of the valve member from the valve seat despite the presence of the requisite fluid pressure on the "upstream" side of the check valve. This distinction as to why the valve is not passing fluid is important, since in the former case the valve is functioning properly and will require no servicing, whereas in the latter case the valve is not operating normally and will require servicing or replacement. As a result, it has sometimes been necessary to disconnect the fluid line on the "upstream" side of the check valve to determine if there is normal fluid pressure upstream of the check valve. Alternatively a sampling valve may be installed upstream of the check valve, so that an observer can monitor any fluid entering the check valve and, in combination with observations made on the "downstream" side of the valve, determine precisely why no fluid is passing through the check valve. Then the observer will be able to have the check valve serviced or replaced if need be.

In practice, the sampling valve can be of fairly simple construction. Nonetheless, having any sampling valve at all in addition to a check valve is undesirable because of added cost and because it introduces another element into the system which could fail and thereby create complications. The cost factor has discouraged use of sampling valves in domestic water supplies.

OBJECTS OF THE INVENTION

As a result, the primary object of this invention is to provide a check valve which includes inspection means therein for disclosing the presence or absence of fluid on the "upstream" side of the valve.

Another object is to provide a check valve which is compatible with piping systems now in general use.

Still another object is to provide a check valve which is reliable, compact, easy to produce, and low in cost.

A further object is to provide a check valve of the character described which is sufficiently low in cost to be used in domestic hot and cold water supply lines in houses and commercial buildings.

Yet another object is to provide a check valve which can have all its internal components assembled into the valve from a single opening in the valve casing.

SUMMARY OF THE INVENTION

These and other objects are achieved by the present invention which comprises a spring-biased check valve of the type described above and which further includes a needle valve in the valve casing. The needle valve communicates with the fluid passageway running through the valve casing "upstream" of where the check valve's valve member contacts its valve seat, so that the needle valve can selectively pass fluid from that passageway to a location outside of the valve casing regardless of to the position of the check valve member relative to its valve seat, in order that the needle valve may function as inspection means for detecting the presence or absence of fluid on the "upstream" side of the valve.

BRIEF DESCRIPTION OF THE DRAWINGS

Still other objects and features of the invention will be more fully described or rendered obvious in the following detailed description of the preferred embodiment, which is to be considered together with the accompanying drawings wherein like numbers refer to like parts and further wherein.

DETAILED DESCRIPTION OF THE PREFERRED EMBODIMENT

Figure 1:
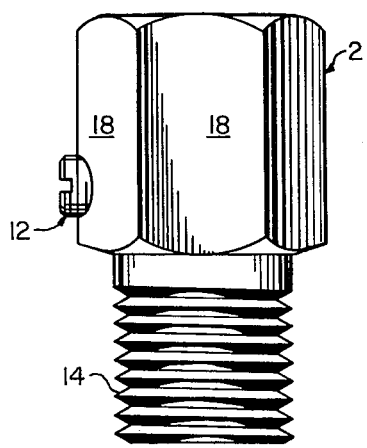
FIG. 1 is a side view of the preferred embodiment of the present invention.
Figure 2:
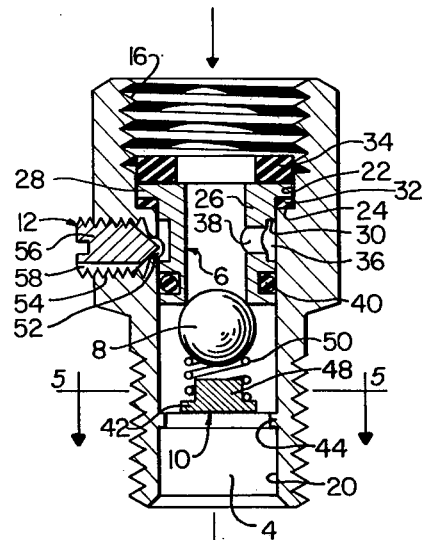
FIG. 2 is a side view in cross-section of the check valve shown in FIG. 1.
Figure 3:
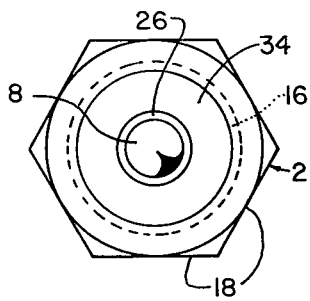
FIG. 3 is a top view of the check valve shown in FIGS. 1 and 2.

Looking first at FIGS. 1 and 2, the preferred form of the invention generally comprises a valve casing 2 which forms the body of the check valve, a longitudinally extending fluid passageway 4 which permits fluid to pass from one end of the casing to the other, a valve seat assembly 6 which is disposed about the perimeter of one segment of passageway 4, a valve member 8 adapted for movement within passageway 4, spring means 10 for biasing valve member 8 towards valve seat assembly 6 so that member 8 can selectively close off passageway 4 to fluid flow, and a needle valve 12 which communicates with passageway 4 "upstream" of where valve member 8 contacts valve seat assembly 6 and thereby permits an observer to detect the presence or absence of fluid at this point regardless of the position of valve member 8 relative to valve seat assembly 6.

Valve casing 2 is formed of metal and is intended for disposition in a fluid line so that the check valve can provide uni-directional flow control for that fluid line. To this end casing 2 is provided with a set of exterior screw threads 14 on one of its ends and a set of interior screw threads 16 on the other of its ends. To facilitate the use of a wrench or similar tool in coupling the check valve into the fluid line, casing 2 also has a portion of its outer region formed so as to present a plurality of hexagonally-arranged surfaces 18.

Valve casing 2 has a central bore 20 and a counterbore 22 which together define passageway 4. Bore 20 and counterbore 22 together define an annular shoulder 24 at their junction. Bore 22 has the interior screw thread 16 which terminates short of annular shoulder 24.

Disposed within casing 2 so as to reduce the effective diameter of fluid passageway 4 is a valve seat assembly 6. Assembly 6 comprises an annular sleeve 26 which has a circular flange 28 on one end and an annular groove 30 in its middle. Sleeve 26 extends into bore 20 and is sized so that it makes a close fit in bore 20 with the inner surface of casing 2, and its flange 28 makes a close fit in counterbore 22. Preferably a resilient annular seal 32 is disposed between annular shoulder 24 and flange 28. Sleeve 26 is held in place in passageway 4 by means of a resilient annular washer 34 which forms a tight fit in counterbore 22. The check valve is installed in a line so that the upper end as seen in FIG. 2 is coupled to the fluid supply, i.e., the high pressure side of the line. Hence the fluid pressure tends to urge washer 34 toward shoulder 24 so as to keep sleeve 26 in place. When sleeve 26 is disposed as shown in FIG. 2, annular groove 30 coordinates with the wall defining bore 20 so as to define an annular chamber 36. At least one hole 38 is provided in sleeve 26 as shown so as to couple the passageway 4 to chamber 36. Preferably valve seat assembly 6 also includes a resilient O-ring 40 in a groove in the lower end of sleeve 26 to prevent fluid contained in chamber 36 from passing into bore 20 by leakage between casing 2 and sleeve 26. As a result, it will be seen that any fluid entering passageway 4 via counterbore 22 can find its way into bore 20 only by passing through that part of passageway 4 defined by the cylindrical inner surface of sleeve 26. Any fluid which finds its way into hole 38 or chamber 36 will be unable to pass on into bore 20 due to the location of seal 40 on the lower end of sleeve 26.

Valve member 8 is adapted to reciprocate within passageway 4 so as to move into or out of engagement with valve assembly 6. Member 8 is essentially a small metal ball which has a diameter greater than the internal diameter of sleeve 26, in order that member 8 can close off the interior of sleeve 26 to fluid flow when the ball is moved up and seated securely on the lower end of sleeve 26.

Figure 4:
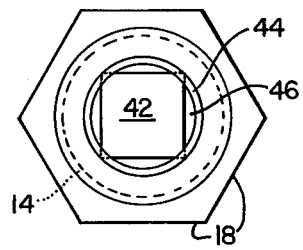
FIG. 4 is a bottom view of the check valve shown in FIGS. 1 and 2.
Figure 5:
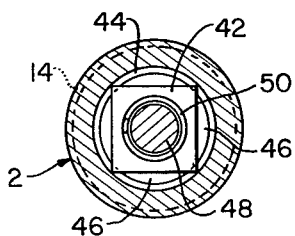
FIG. 5 is a top view in section taken along line 5—5 of FIG. 2.

A spring assembly 10 serves to yieldably urge valve member 8 into engagement with the lower end of sleeve 26. To this end the spring assembly 10 comprises a rectangular base 42 which is seated on a circular rim 44 extending into bore 20 from casing 2. Base 42 and rim 44 are sized so that (a) the base's corners can seat securely on rim 44, and (b) as shown in FIGS. 4 and 5, a plurality of passageways 46 will exist to permit fluid to pass between base 42 and rim 44. Extending perpendicularly from the plane of base 42 is a post 48. Post 48 is preferably formed integral with base 42 and serves as a guide for a compression spring 50 which rests on base 42 and engages valve member 8. Spring 50 urges member 8 away from base 42 and towards sleeve 26. As indicated in FIG. 2, when valve member 8 is urged away from sleeve 26 and towards rim 44, it can yield sufficiently such that the passageway running through the interior portion of sleeve 26 will be open to fluid flow.

The aforementioned structure functions as a simple check valve in that (1) when fluid flows into passageway 4 from a first direction so that the flow reinforces the spring bias on valve member 8, member 8 will remain firmly engaged with the valve seat and passageway 4 will be closed off to fluid flow, and (2) when fluid flows into passageway 4 in a second and opposite direction (as shown by the arrows in FIG. 2) so as to act to counter the spring bias on valve member 8, member 8 will disengage from seat assembly 6 and open up passageway 4 to the fluid flow so long as the pressure exerted on member 8 by the fluid flow is greater than the pressure exerted on member 8 by spring means 10. As a result, when the check valve (with a suitably biased valve member) is inserted into a fluid line, it can act as a one-way gate and assure that fluid will flow through the line in only one direction.

Figure 6:
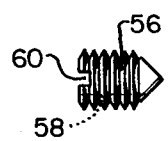
FIG. 6 is a side view of the needle valve member used in the present invention.
Figure 7:
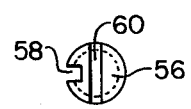
FIG. 7 is an end view of the needle valve member shown in FIG. 6.

The check valve also includes inspection means in the form of a needle valve 12 for detecting the presence or absence of fluid on the "upstream" side of valve member 8. Needle valve 12 comprises a bore 52 and a threaded counterbore 54 which communicate with one another and together constitute a side opening in casing 2 forming a passageway connecting annular chamber 36 with the region outside valve casing 2 (see FIG. 2). A threaded needle valve member 56 is screwed into counterbore 54 so that its conical tip can be positioned to alternately open up or close off bore 52 as valve member 56 is moved longitudinally by rotating it in bore 54. Valve member 56 includes a slot 58 running along its length, as shown in FIGS. 6 and 7. Slot 58 has a depth less then the radius of valve member 56, so that its forward end terminates short of the forward end of the conical tip of the valve member. Slot 58 serves to transmit any fluid making its way out of annular chamber 36 and bore 52 along counterbore 54 so that the fluid can make its way out of valve casing 2 without valve member 56 being completely withdrawn from counterbore 54. However, valve member 56 can be advanced in counterbore 54 far enough so that its pointed end will close off bore 52, so that no fluid can pass from annular chamber 36 to the region outside valve casing 2. When valve member 56 is withdrawn along the threads of counterbore 54 sufficiently so that its pointed end no longer closes off bore 52, fluid from annular chamber 36 will be able to pass to the region outside the valve casing 2 via bore 52, counterbore 54 and slot 58. In this way needle valve 12 allows an observer to monitor the presence or absence of fluid in annular chamber 36 and, due to hole 38, the presence or absence of fluid in fluid passageway 4 upstream of the valve seat for ball member 8. It will be appreciated that the use of a needle valve as the inspection means assures that an observer can release fairly small amounts of fluid during monitoring, and when it is closed tight there is no danger of its leaking due to the metal-to-metal engagement made by the point of valve member 56 with the surfaces defining hole 52.

A kerf 60 is provided at one end of valve member 56 to assist in positioning member 56 within counterbore 54 using a screwdriver.

MODIFICATIONS OF THE PREFERRED EMBODIMENT

Numerous modifications may be made to the preferred embodiment without departing from the scope of the present invention. Thus, for example, one might provide a check valve which has its sleeve 26 formed from some substance other than metal, e.g., a plastic or rubber. Or one might form valve casing 2 or check valve member 8 from a different material than metal, e.g., a suitable plastic.

Still other changes will be obvious to persons skilled in the art and are deemed to be within the scope of the present invention.

ADVANTAGES OF THE INVENTION

There are numerous advantages associated with using the present invention. First, the invention provides a check valve which includes inspection means for disclosing the presence or absence of fluid on the "upstream" side of the valve. Second, the invention provides a valve which can have its internal components loaded into the valve from a single end of the valve casing, i.e., counterbore 22. Third, the valve is reliable, easy to produce, and low in cost. And fourth, the invention is fully compatible with piping systems now in general use.

What is claimed is:

1. In a check valve of the type comprising (a) a valve casing, said valve casing having first and second ends and defining a passageway extending from said first end to said second end, (b) a valve seat disposed about the perimeter of said passageway intermediate said first and second ends, (c) a valve member disposed within said passageway between said valve seat and said second end, said valve member being sized relative to said passageway and said valve seat so that said member is movable along said passageway yet capable of seating on said valve seat so as to close off said passageway, and (d) spring means disposed within said passageway between said valve member and said second end, said spring means being disposed to yieldably urge said valve member into engagement with said valve seat so as to close off said passageway, whereby (1) when fluid flows into said passageway from said second end toward said first end so as to reinforce the spring bias on said valve member, said valve member will remain seated on said valve seat and said passageway will be closed off to fluid flow, and (2) when fluid flows into said passageway from said first end toward said second end so as to counter the spring bias on the valve member, said valve member will disengage from the valve seat and open up said passageway to fluid flow if the pressure exerted on said valve member by the fluid flow is greater than the pressure exerted on the valve member by said spring means;

the improvement wherein said passageway comprises a bore extending from said second end of said casing and a counterbore extending from said first end of said casing coaxially with said bore, said valve seat comprises a hollow sleeve disposed within said bore and a flange on one end of said sleeve disposed in said counterbore, the outer side of said sleeve is contoured so as to define a chamber between said sleeve and said casing, said sleeve also has at least one hole providing fluid communication between said chamber and said bore, and a needle valve is mounted in said casing in communication with said chamber, said needle valve being adapted to function as a sampling valve to reveal by access to said chamber the presence or absence of fluid in said passageway at said first end of said valve casing.

2. A check valve according to claim 1 wherein said needle valve comprises a needle valve member screwed into a side port in said casing that leads directly to said chamber.

3. A check valve according to claim 2 wherein said side port in said casing has a first relatively small diameter portion at one end intersecting said chamber and a second relatively large diameter portion connecting said first portion to the exterior of said casing, and said needle valve member has a slot running longitudinally of said needle valve member in position to pass fluid from said chamber when said needle valve is opened by moving said needle valve member in said side port.

4. A check valve according to claim 1 wherein said chamber is annular and is formed by a peripheral groove in the outer surface of said sleeve.

5. A check valve according to claim 1 wherein said valve member in said passageway is a ball, and further wherein said spring means comprises a coil spring engaging said ball and a spring retainer member seated on a flange formed on the inner surface of said casing and extending about the circumference of said bore adjacent said second end, said spring retainer being formed so as to define at least one opening between it and said casing, whereby fluid introduced to said passageway at said first end can flow past said ball and spring and exit said passageway at said second end.

* * * * *